Patented Aug. 14, 1928.

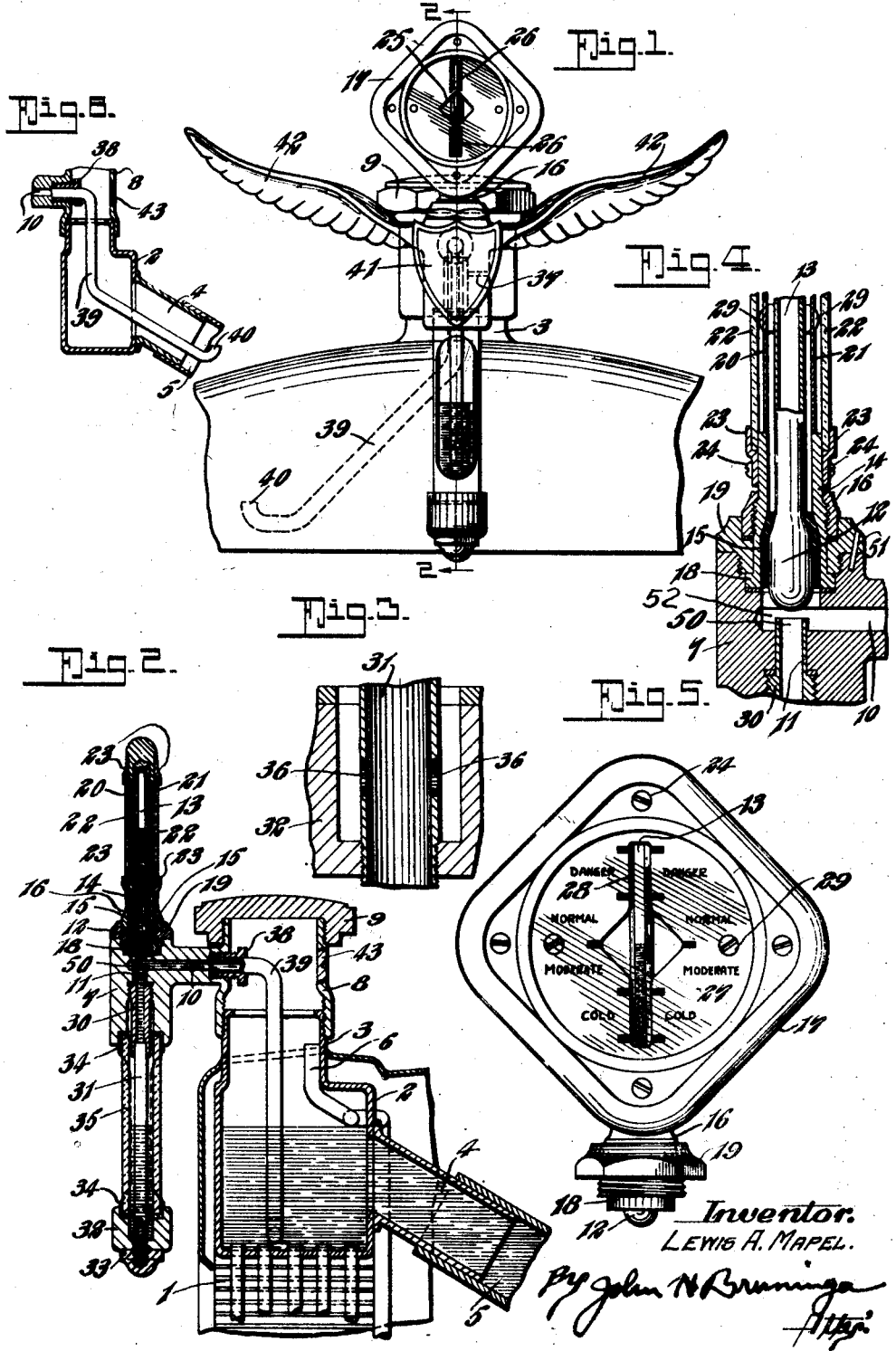

1,680,425

UNITED STATES PATENT OFFICE.

LEWIS A. MAPEL, OF ST. LOUIS, MISSOURI, ASSIGNOR TO THE AUTOMATIC APPLIANCE COMPANY, OF ST. LOUIS, MISSOURI, A CORPORATION OF MISSOURI.

INDICATING DEVICE FOR INTERNAL-COMBUSTION ENGINES.

Application filed May 18, 1923. Serial No 639,735.

This invention relates to a device for indicating the condition of a water cooled internal combustion engine provided with a radiator, and is more particularly applicable for use on automobiles.

An automobile engine is usually provided with a water jacket in which circulates the cooling medium, while a radiator is provided through which the medium circulates in order to dissipate the heat. It is desirable that the temperature of the circulating water be under observation because for most efficient operation, the cylinders and, therefore, the medium should be hot; accordingly a shutter is often provided, whereby the conditions can be controlled. The temperature of the circulating water should, however, be below boiling point, for if the water should evaporate resulting in loss, the power plant is liable to be damaged when the water jacket runs partially or wholly dry. Moreover the level of the water in the radiator should not be allowed to drop below normal, otherwise overheating takes place; the radiator should, therefore, be maintained substantially full.

Now the true conditions are not correctly indicated by a thermometer which is responsive to the temperature of the space above the level of the water in the radiator; for even under favorable conditions the temperature of the atmosphere in such space lags considerably behind the temperature of the water. Moreover the neck and the upper part of the radiator itself are subject to cooling, which not only causes the lag to be still greater even under favorable conditions, but also causes fluctuation in accordance with the outside temperature and the speed of the automobile.

The employment of a thermometer with a bulb or heat responsive element dipping into the water in the top of the radiator, gives a more correct indication than where such element is only subject to the air and vapor in the space above the water level. Such location of the responsive element is, however, open to the objection that it requires a long thermometer stem which is subject to breakage, even if protected; the exposure of a long stem to the varying temperature has the effect of causing errors; and the radiator usually has obstructions preventing insertion of the bulb a sufficient distance so as to be fully immersed at varying levels, one such obstruction being the usual baffle in the path of the incoming water from the jacket and located directly below the filling neck of the radiator. Such a thermometer so positioned fails to give a true indication when the water level drops below the bulb.

One of the objects of this invention, therefore, is to provide a device of the character described, in which the thermometer, while located above the water level or distant therefrom, is nevertheless thermally exposed to the action of the water or circulating medium so as to always be responsive to its temperature changes.

Another object of this invention is to provide a device of the character described, in which a heat transmitting water column is not only established between the water and the thermometer, but is maintained at varying water levels.

Another object of this invention is to provide such a column in which circulation takes place so as to maintain the thermometer at substantially the same temperature as the water.

Another object of this invention is to avoid radiation and maintain the column at the same temperature as the water.

Another object of this invention is to provide means for visually indicating when abnormal conditions occur either in the temperature of the water or its level.

Another object of this invention is to provide a combined water level and temperature indicator in which the elements are so combined that by their joint action the complete conditions of the water cooled power plant are under observation.

Further objects will appear from the detail description taken in connection with the accompanying drawing, in which:

Figure 1 is a front elevation of a device embodying this invention;

Figure 2 is a section on line 2—2, Figure 1;

Figure 3 is an enlarged detail of a part of Figure 2;

Figure 4 is an enlarged detail of another part of Figure 2;

Figure 5 is a rear elevation of a part of the indicating device; and

Figure 6 is a view showing another embodiment of this invention.

Referring to the accompanying drawing, 1 designates a radiator provided with the usual top or header 2 having a neck 3, and provided with an inlet 4 connected as usual by a flexible pipe or hose 5 with a water jacket of an automobile engine (not shown). The parts referred to are common in the prior art and a further detail description is, therefore, unnecessary, it being noted that the water enters the radiator from the water jacket through the inlet 4, circulates down through the radiator and returns to the water jacket. Except where a thermo-siphon system is used, a water pump is provided which promotes the circulation. An overflow 6 leading nearly to the top of the neck is also provided to not only permit overflow but also to allow the escape of steam when formed.

Arranged for mounting on the radiator is a mounting or casing 7 which is attached to or integral with a nipple 8 arranged to be threaded on the neck 3, while the nipple is arranged to be closed by a cap 9. In practice the lower part of the nipple is expanded so as to fit over the usual threaded neck 3, while the upper end of the nipple is externally threaded to receive the cap 9 which normally fits on the neck 3.

The mounting 7 is bored as at 10 and 11, Fig. 4, so as to provide a chamber 52 at the intersection of the channels thus formed, and in this chamber is arranged to project the bulb 12 or responsive element of a thermometer 13 which may be of any suitable form, but preferably filled with a non-freezing liquid, such as alcohol or pentane. Since the variations of temperature can be between small limits, the stem can be short. This thermometer is mounted in a threaded sleeve 14 with a heat insulating layer 15 of a suitable cement; such cement also serves to maintain the thermometer in position. This sleeve is screwed into a lug 16 on a frame 17 and is provided with an annular flange 18 arranged to maintain loosely the coupling 19, while a washer is interposed between this coupling and the lug 16. The frame 17 is provided with plates 20 and 21 over which lie plates 22 of glass maintained in position by rims 23, which are secured to the frame by screws 24. The plate 20 is provided with apertures 25 and 26 while the plate 21 is provided with a central aperture 27 merging into slots 28. This plate 21 is also provided with designations as shown in Figure 5. The plates 20 and 21 may be secured to the frame by screws 29.

The mounting 7 is counter-bored and threaded to receive the sleeve 14 and coupling 19 and a suitable packing washer may be interposed between 14 and 7 so as to form a tight joint. Accordingly the thermometer and its frame may be secured on the mounting as shown in Figures 1 and 2 with the plate 21 and its designations thereon facing the driver of the automobile.

The lower end of the mounting is counter-bored and threaded to receive a threaded nipple 30 in which is secured by a forced fit or otherwise, a pipe or tube 31, the lower end of which extends through a cap 32, Figures 2 and 3, and is threaded to receive a nut 33. The cap 32 is counter-bored to receive a tube 34 which is cut away to expose a gage glass 35 therein and this tube and gage glass are secured in position by the nipple 30, tube 31 and the nut 33, suitable washers being interposed as shown.

It will be noted that both the mounting 7 and the cap 32 are suitably counter-bored so as to space the nipple 30 as well as the tube 31 from the inside bore of the mounting, the cap and the gage glass in order to provide a space as shown in Figure 2. The lower end of the tube is also apertured as shown at 36, Fig. 3, while the mounting is bored as shown at 37, Fig. 1, to provide a nozzle opening to the space between the nipple 30 and the mounting 7 and directed laterally of the radiator.

The channel 10 of the mounting is counter-bored and threaded to receive a nut 38 in order to secure thereto a bent end of a tube or conduit 39, which in turn is bent laterally as shown in Figure 1 to extend into the radiator and considerably below the water level therein, and this tube not only opens at its lower end but is turned up as shown at 40. The tube 39 may be made of copper so as to be flexible in order that it may be bent to suit requirements in order to reach down in the radiator and be positioned substantially on the core thereof at the bottom of the header 2 as shown in Fig. 2. This tube may, however, be bent so as to extend into the inlet as shown in Figure 6. The nipple 30 has an extension 50, Fig. 4, projecting into the chamber 52 in order to insure expulsion of air when the conduits are filled.

The front of the mounting may be provided with a suitable ornamental shield 41, while extending from the sides may be ornamental wings 42. This shield and its wings, however, are not only ornamental but they perform the function of heat dissipating radiators since they are made of metal and integral and, therefore, thermally connected with the mounting which provides a casing having formed therein a chamber into which projects the bulb or responsive element of a thermometer and which chamber has connected thereto the conduits 30 and 39 as shown in Fig. 2.

In order to permit the device to be placed in position an aperture is provided opposite the tube 39 which is closed by a plug 43, Figs. 2 and 6, which is slotted to permit its manipulation by a screw-driver.

When the radiator is filled with water to overflowing, this water will rise in the conduit 39, flow into the channel 10, down the conduit 30, 31 and up in the gage glass 35, thereby forcing all the air out of the conduits, this air escaping through the nozzle opening 37. This complete filling can be accomplished readily since the overflow pipe 6 is of limited capacity and, therefore, permits the water to overflow the nipple 7. After the radiator has, therefore, been filled, there is provided a U-tube consisting of the conduit 39, the channel 10 and the conduit 30—31, the conduit 39 dipping into the water in the radiator, while the conduit 30, 31 dips into the water in the gage glass 35. It will, therefore, be seen that the water in the gage glass will rise to and be maintained at the same level as the water in the radiator; accordingly the gage glass furnishes a level indicating device which will always indicate the level of the water in the radiator.

It will be seen that the conduit 39 leading to the responsive element of the thermometer and dipping into the water in the radiator maintains a water column leading from the water to the chamber in which projects the thermometer bulb. As the temperature of the water in the radiator rises, a circulation will be set up causing the water in the chamber to be maintained at the same temperature as that in the radiator. This circulation is promoted by the inclination of the conduit 39 as will be readily understood; for in an inclined tube containing a column of water there will be a circulation due to the fact that the hotter particles will rise along the upper inside face of the inclined tube, while the colder particles will drop along the lower inclined face. Accordingly not only is there established a heat transmitting column of water from the water in the radiator to the thermometer bulb, but the temperature of the water in the chamber will be maintained at a value corresponding to that in the radiator. Accordingly the thermometer will always indicate the correct temperature of the water in the top of the radiator which corresponds closely to that in the water jacket.

It will also be seen that while the responsive element or bulb of the thermometer is above the normal level of the water in the radiator and normally out of communication with the space above the water level therein, a heat transmitting column of water from the body of water in the radiator to the bulb is not only established but it is maintained even when the level of the water in the radiator drops below normal. It will be noted that if the end 40, Figure 1, were not bent up there would be a tendency for the water to flow out of the end of the tube 39; however, by bending up this tube as shown at 40 the water cannot flow out due to the fact that the atmospheric pressure on the water in the end of the tube will hold the column in the tube 39 raised. This results from the fact that the tubes 39 and 31 form in effect an inverted U tube, each having its end turned up; the leg 39 of the U has a distinct turned up part 40 while the leg 31 of the U has the up-turned part formed by the gauge glass surrounding this tube and open thereto through the apertures 36. The atmospheric pressure acts on each of these turned up ends to hold the water in the legs of the inverted U. Moreover the bulb is maintained out of communication with the space above the water level when such level drops below normal; for even in the water level drops below the lower end of the conduit 39, this conduit still remains full of water in view of the fact that its end is turned up and in view of the fact that this turned up end is above the apertures or openings 36 in the conduit 30—31. When the radiator is filled to overflowing, the U tube formed as previously described, will be completely filled, and as the water level in the radiator drops, the level in the gauge glass 35 will also drop to correspond with the water level in the radiator. This condition is maintained until the water level in the radiator drops below the up-turned end 40 of the tube 39. Since, however, the tip of this up-turned end is above the apertures 36, the water will not flow entirely out of the chamber surrounding the tube 31 even when the water level in the radiator drops below the end 40, but will be maintained at a height in that chamber to the level of the end 40. The column of water in the tube 31, therefore, forms a balancing column for the column of water in the tube 39.

If it should happen that the water level drops considerably below the conduit 39 so that steam will be formed more rapidly than the overflow 6 can carry it off, the pressure thus created will cause the water to be blown through the conduit 39, the channel 10, the conduit 30, 31 and the gauge glass through the nozzle 37. This will furnish an indication that the danger point has been reached and as this stream is projected laterally, it will readily be visible by the driver. The same indication is afforded even if steam is formed before the water level drops below the lower end of the conduit 39.

The heat radiators 41 and 42 serve to dissipate the heat from the mounting 7; accordingly the chamber is kept at a temperature below the boiling point; if, therefore, steam or vapor should be formed or collect in the chamber, it will be condensed as rapidly as formed so as to always maintain the thermometer bulb in a water bath.

It will, therefore, be seen that the invention accomplishes its objects. The thermometer is supported above the normal level of the water in the radiator or distant therefrom so that the bulb and stem can be short and can be protected by being enclosed in a chamber. The bulb or responsive element is, however, maintained in thermal connection with the water in the top of the radiator by a heat transmitting column of water in which circulation is promoted to keep the bulb in a water bath maintained at substantially the same temperature as the water in the radiator. The bulb is, however, maintained out of communication with the space above the water level, even when the level drops below normal, due to the fact that the circulating water column is maintained even if the level drops below the lower end of the conduit. The true temperature of the water in the top of the radiator is, therefore, always indicated as distinguished from an indication of the temperature of the space above the water level; the temperature lag between the water in the radiator and the thermometer will, therefore, be negligible.

The second conduit leading from the chamber enclosing the bulb dips into the water in the gage glass and below the normal water level, and this gage glass forms a turned up leg in communication with the atmosphere through aperture 37; filling of the device is, therefore, facilitated. It may also be noted that since in cold weather it is the practice to fill a radiator with a non-freezing medium as by the addition of alcohol, the conduits and gage glass are also filled with such a non-freezing solution. Moreover by pouring the non-freezing medium, such as alcohol, into the radiator when nearly full, it is really insured that the conduits and gage glass will be filled with alcohol.

The mounting of the thermometer above the level indicator not only enables both to be supported on the same base or mounting, but also enables the same conduit dipping into or immersed in the water, to establish a heat transmitting column to the thermometer and a hydro-static column to the level indicator or gage glass. This not only simplifies the construction but enables the two indicators by their conjoint action to indicate the conditions of the water cooled engine.

The device when in position cannot be detached without damage; for the nipple 8 cannot be turned when the device is once in place. After the frame carrying the thermometer is in place on the mounting, it can be secured, as by a pin 51 passing through the coupling and into the mounting as shown in Figure 4. This permits the frame to be turned to properly aline it with the line of vision of the driver.

It is obvious that various changes may be made in details of construction without departing from the spirit of this invention; it is, therefore, to be understood that this invention is not to be limited to the specific details shown and described.

Having thus described the invention, what is claimed is:

1. A device for indicating the conditions of a water cooled internal combustion engine provided with a radiator, comprising, a thermometer having a heat responsive element, a casing providing a liquid retaining chamber in which said element is positioned, and a conduit having one end immersed in the water of the radiator and having its other end opening into said chamber, said chamber being sealed above the connection of said conduit therewith in order to maintain a circulating column of liquid from the water to said chamber and in thermal contact with said element.

2. A device for indicating the conditions of a water cooled internal combustion engine provided with a radiator, comprising, a thermometer having a heat responsive element, a casing providing a liquid retaining chamber in which said element is positioned, and an inclined conduit having its lower end immersed in the water of the radiator and having its other end opening into said chamber, said chamber being closed above the connection of said conduit therewith and sealed against entrance of air thereto.

3. A device for indicating the conditions of a water cooled internal combustion engine provided with a radiator, comprising, a thermometer having a heat responsive element, a casing providing a liquid retaining chamber in which said element is positioned, and a conduit having its lower end turned up and immersed in the water of the radiator and having its other end opening into said chamber, said chamber being closed above the connection of said conduit therewith and sealed against entrance of air thereto.

4. A device for indicating the conditions of a water cooled internal combustion engine provided with a radiator, comprising, a thermometer having a heat responsive element, a casing providing a liquid retaining chamber in which said element is positioned, and an inclined conduit having its lower end turned up and immersed in the water of the radiator and having its other end opening into said chamber, said chamber being closed above the connection of said conduit therewith and sealed against entrance of air thereto.

5. A device for indicating the conditions of a water cooled internal combustion engine provided with a radiator, comprising, a thermometer having a heat responsive element, a casing providing a liquid retaining chamber in which said element is positioned, a conduit having one end immersed in the water of the radiator and having its other end opening in said chamber, constructed and arranged to maintain a circulating column leading from the water to said chamber, and a second conduit interconnected with said chamber and adapted to maintain a balancing column.

6. A device for indicating the conditions of a water cooled internal combustion engine provided with a radiator, comprising, a thermometer having a heat responsive element, a casing providing a liquid retaining chamber in which said element is positioned, a conduit having one end immersed in the water of the radiator and having its other end opening into said chamber, and a second U conduit interconnected at one end with said chamber and open at its other end to the atmosphere.

7. A device for indicating the conditions of a water cooled internal combustion engine provided with a radiator, comprising, a thermometer having a heat responsive element, a casing providing a liquid retaining chamber in which said element is positioned, a conduit having one end immersed in the water of the radiator and having its other end opening into said chamber, and a second conduit interconnected with said chamber, extending down below the water level and having a return leg rising above the water level.

8. A device for indicating the conditions of a water cooled internal combustion engine provided with a radiator, comprising, a thermometer having a heat responsive element, a casing providing a liquid retaining chamber in which said element is positioned, a conduit having one end turned up and immersed in the water of the radiator and having its other end opening into said chamber, and a second conduit interconnected with said chamber, extending down below the water level and having a return leg rising above the water level.

9. A device for indicating the conditions of a water cooled internal combustion engine provided with a radiator, comprising, a casing providing a water receiving chamber sealed against entrance of air, a thermometer having a heat responsive element, means for supporting said thermometer with said element in said chamber and above the normal level of the water in the radiator, a conduit for establishing a heat transmitting water column from the body of water in the radiator to said chamber and said element, and means for water sealing said conduit adapted to maintain such column when the level of the water in the radiator drops below normal.

10. A device for indicating the conditions of a water cooled internal combustion engine provided with a radiator, comprising, a casing providing a water receiving chamber sealed against entrance of air, a thermometer having a heat responsive element, means for supporting said thermometer with said element in said chamber and above the normal level of the water in the radiator but normally out of communication with the space above the water level therein, a conduit for establishing a heat transmitting water column from the body of water in the radiator to said chamber and said element, and means for water sealing said conduit adapted to maintain such column when the level of the water in the radiator drops below normal.

11. A device for indicating the conditions of a water cooled internal combustion engine provided with a radiator, comprising, a thermometer having a heat responsive element, a casing providing a chamber for said element, a conduit having one end immersed in the water of the radiator and having its other end opening into said chamber, constructed and arranged to maintain a circulating column of water leading from the water of the radiator to said chamber, a second conduit interconnected with said chamber and adapted to maintain a balancing column, and a nozzle connected with said second conduit and through which the water is projected under abnormal conditions.

12. A device for indicating the conditions of a water cooled internal combustion engine provided with a radiator, comprising, a thermometer having a heat responsive element, a casing providing a liquid retaining chamber for said element and sealed against entrance of air, a conduit having one end immersed in the water of the radiator and having its other end opening into said chamber, constructed and arranged to maintain a circulating column leading from the water to said chamber, and a heat dissipating radiator for said chamber.

13. A device for indicating the conditions of a water cooled internal combustion engine provided with a radiator, comprising, a thermometer, a water level indicator, and means for establishing a heat transmitting water connection to said thermometer and a hydrostatic water connection to said indicator.

14. A device for indicating the conditions of a water cooled internal combustion engine provided with a radiator, comprising, a thermometer having a heat responsive element, a casing providing a liquid retaining chamber in which said element is positioned and sealed against entrance of air, a conduit having one end immersed in the water of the radiator and having its other end opening into said chamber, and a level indicator connected with said conduit and adapted to air seal said chamber.

15. A device for indicating the conditions of a water cooled internal combustion engine provided with a radiator, comprising, a thermometer having a heat responsive element, a casing providing a liquid retaining chamber in which said element is positioned and sealed against entrance of air, a conduit having one end immersed in the water of the radiator and having its other end opening into said chamber, and a transparent second chamber connected with said chamber and in which the water is adapted to stand.

16. A device for indicating the conditions of a water cooled internal combustion engine provided with a radiator, comprising, a thermometer having a heat responsive element and sealed against entrance of air, a casing providing a liquid retaining chamber in which said element is positioned, a conduit having one end immersed in the water of the radiator and having its other end opening into said chamber, and a gage glass connected to said chamber and adapted to air seal said chamber.

17. A device for indicating the conditions of a water cooled internal combustion engine provided with a radiator, comprising, a mounting on the radiator, a gage glass on said mounting, closed at the bottom and open to the atmosphere, and a conduit arranged to dip into the water in the radiator and opening into said glass at its bottom.

In testimony whereof I affix my signature this 16th day of May, 1923.

LEWIS A. MAPEL.